United States Patent [19]

Bowsky

[11] Patent Number: 4,804,396
[45] Date of Patent: Feb. 14, 1989

[54] METHOD FOR MANUFACTURING HERMETIC TERMINAL ASSEMBLIES

[75] Inventor: Benjamin Bowsky, Warren County, Ohio

[73] Assignee: Emerson Electric Co., St. Louis, Mo.

[21] Appl. No.: 732,704

[22] Filed: May 10, 1985

[51] Int. Cl.⁴ .................................................. C08C 29/00
[52] U.S. Cl. ................................. 65/59.27; 65/59.25; 65/59.6
[58] Field of Search ............. 65/36, 40, 42, 59.1, 65/59.2, 59.25, 59.27, 59.6, 154, 155, 58, DIG. 4, DIG. 11, DIG. 12

[56] References Cited

U.S. PATENT DOCUMENTS

| | | | |
|---|---|---|---|
| 2,648,167 | 8/1953 | Ellwood | 65/DIG. 12 |
| 3,432,282 | 3/1969 | Schultz | 65/DIG. 12 |
| 3,460,219 | 8/1969 | Shiragaki | 65/155 |
| 3,535,099 | 10/1979 | Loose | 65/DIG. 12 |
| 4,086,075 | 4/1978 | Ekkelboom et al. | 65/40 |
| 4,343,643 | 8/1982 | Miller | 65/154 |
| 4,377,404 | 3/1983 | Hoshikawa et al. | 65/59.25 |
| 4,450,033 | 5/1984 | Little | 65/36 |
| 4,521,237 | 6/1985 | Logothetis | 65/42 |

Primary Examiner—Arthur Kellogg
Attorney, Agent, or Firm—Polster, Polster and Lucchesi

[57] ABSTRACT

A method of forming glass to metal hermetic seals in a terminal assembly of a housing part wherein an upwardly directed glass melting heating gradient is applied to a housing part having a glass sleeved terminal pin supportedly disposed in an aperture therein with sufficient heat intensity to flow the glass sleeve in an upwardly direction from bottom to top to fuse the terminal pin in the housing part with minimal voids.

9 Claims, 2 Drawing Sheets

METHOD FOR MANUFACTURING HERMETIC TERMINAL ASSEMBLIES

BACKGROUND OF THE INVENTION

The present invention relates to hermetic terminal assemblies and, more particularly, to a method and apparatus for fusing glass sleeved terminal pins in housing parts, such as battery covers of the button type.

In the past it has been the practice to assemble terminal pins supportedly disposed in apertures of metallic housing parts such as button type batteries by fusing the glass sleeves surrounding the pins into the housing parts with high intensity heat sufficient to flow the glass and accomplish fusion of the several assembled parts. The present invention recognizes that past fusion processes have not always been entirely successful, with voids developing in the flowed glass which, on occasion, have resulted in weakened hermetic seals and consequent discarding of entire assemblies. Further, such past melting processes often have been inefficient in operation and maintenance, requiring large quantities of energy and complex machinery to carry out the processes.

The present invention, recognizing the deficiencies and inadequacies of past operations, and, more particularly, recognizing the importance of controlling the direction of glass flow, provides a unique, useful and efficient method and apparatus for eliminating such deficiencies and inadequacies, the novel method and apparatus being straightforward and economical in operation and maintenance, resulting in the efficient production of high quality terminal assemblies with a minimum of rejection and failure.

It is generally known in the heating oven art to control the amount of heat emission, such as is taught by unexpired U.S. Pat. Nos. 4,331,858, issued to D.L. Wagner on May 25, 1982; 4,164,642, issued to E. Ebert on Aug. 14, 1979p and 3,471,682, issued to R. M. Hisey, et al on Oct. 7, 1969; all of which teach the control of infrared wave lengths and which utilize reflective and shielding radiation devices. Expired U.S. Pat. No. 3,045,100, issued to C. A. Mills on July 17, 1962, also broadly teaches the utilization of carbon black to control heat ray emission. Further, expired U.S. Pat. No. 3,052,789, issued to B. E. Trainor on Sept. 4, 1962; and No. 3,157,476; issued to H. L. Smith, Jr. on Nov. 17, 1964, both teach devices for controlling and reflecting radiant heat energy. However, none of the aformentioned patents teaches or even remotely suggests the novel method and apparatus of the present invention which, not only recognizes the importance of controlling heating and glass flow in a preselected direction, but which also accomplishes the same in a unique and novel fashion.

Various other features of the present invention will become obvious to one skilled in the art upon reading the disclosure set forth hereinafter.

SUMMARY OF THE INVENTION

More particularly, the present invention provides a method of forming glass to metal hermetic seals in a terminal assembly of a housing part having a terminal pin receiving aperture extending therein comprising: inserting a terminal pin surrounded by a glass sleeve into the aperture of the housing part; inserting the housing part with the pin and glass sleeve supportedly disposed in the aperture thereof into a heating zone with the longitudinal axes of the pin and glass sleeve supported in the aperture of the housing part in a substantially vertical position; and applying an upwardly directed glass flow heating gradient to the housing part while disposed in the heating zone sufficient to cause the glass sleeve to flow in an upwardly direction from bottom to top to firmly fuse the terminal pin in the housing part aperture with minimal voids. In addition, the present invention provides an apparatus for forming glass to metal seals in terminal assemblies of apertured housing parts having glass sleeved terminal pins supportedly extending in the apertures of the housing parts comprising: an enclosed oven chamber having an inlet end and an outlet end; an endless conveyor flight disposed to moveably pass within the chamber to carry housing parts thereon with the glass sleeved pins in substantially vertical position for preselected residence periods; and heating means disposed within the chamber arranged to apply an upwardly directed glass flow heating gradient to the housing parts while disposed in the chamber to cause the glass sleeves of the pins to flow in an upwardly direction from bottom to top to firmly fuse the terminal pins in the housing parts with minimal voids. Further, the present invention provides a novel heat conductive support fixture recessed to receive the housing parts and supportedly maintain them in preselected position to optimize the heat gradient.

It is to be understood that various changes can be made by one skilled in the art in the several steps of the method and in the several parts of the apparatus disclosed herein without departing from the scope of spirit of the present invention.

BRIEF DESCRIPTION OF THE DRAWINGS

Referring to the drawings which disclose one advantageous embodiment of the present invention and a modification thereof.

DETAILED DESCRIPTION OF THE DRAWINGS

Figure 1:
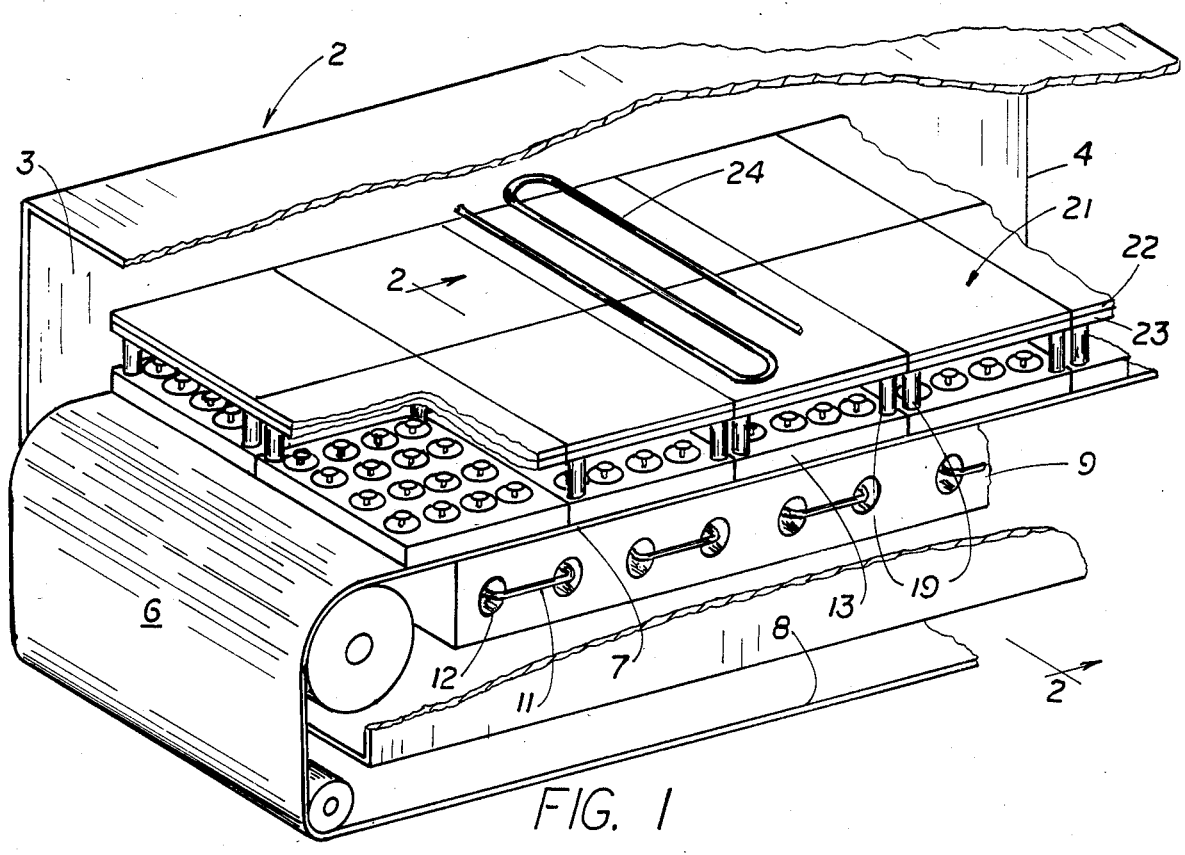
FIG. 1 is a partially broken away isometric view of a portion of the novel heating oven arrangement.

Referring to FIG. 1 of the drawings, there is disclosed an enclosed longitudinally extending oven  ̇u ing chamber 2 having opposed inlet and outlet  ̇n and 4 respectively, the outlet end not being disclosed in detail because of illustrative limitations. Disposed within oven chamber 2 is the upper flight of an endless conveyor belt 6. Belt 6 can be a thin endless mesh stainless steel or similar heat conductive metal belt of metallic laced plate carrying loops trained about a pair of spaced rotatably mounted rollers, sprockets or pulleys located adjacent the opposed inlet and outlet ends of the oven. As is known in the conveyor art either one or both of the pulleys may be motor driven to move the belt from the inlet end 3 of oven 2 to outlet end 4. It is to be understood that other types of endless conveyors could also be utilized with oven 2 without departing from applicant's inventive concept. As disclosed, conveyor 6 includes upper load carrying flight 7 and spaced lower flight 8, the upper flight being disposed within oven chamber 2 and the lower flight 8 being disposed outside oven chamber 2 to increase belt life. Upper flight 7 serves to carry the housing parts or battery covers with their glass sleeved terminal pins (described hereinafter) from the inlet end 3 of oven 2 to outlet end 4. It is to be understood that conveyor 6 can be driven at preselected speeds to control the residence time of the article to be treated in the oven for a preselected period in accordance with other heating parameters and the results desired.

Disposed immediately below upper flight 7 of conveyor 6 is a first or primary heating means 9. Heating means 9 includes a heat conductive floor which advantageously can be in the form of a silicon carbide slab having spaced transversely extending electric heating elements 11. Elements 11, which advantageously can be of a nickle chromium alloy ("nichrome") or other suitable electrically conductive materials, extend in a transverse fashion to the direction of flight movement in spaced relation to the walls of transversely extending expansion passages 12. Heating means 9 serves to transmit a major portion of a preselected heating gradient maintained in oven 2 upwardly through the upper flight 7 of endless conveyor 6 to the housing parts to be treated as they are moved through oven 2 on flight 7.

Figure 2:
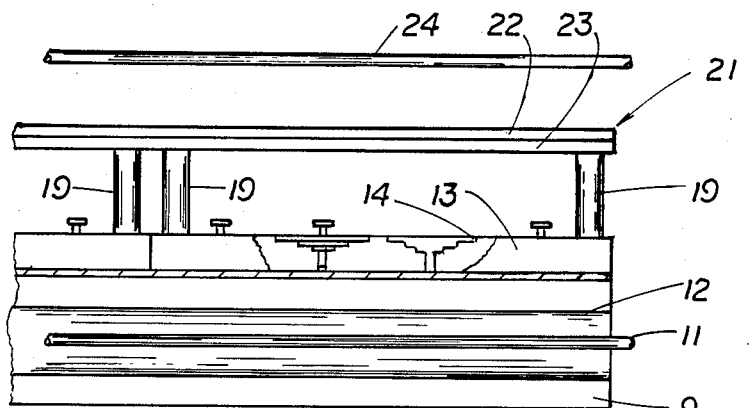
FIG. 2 is an enlarged cross-sectional view of a portion of the heating oven of FIG. 1, taken in a plane passing through line 2—2 of FIG. 1, a terminal assembly and housing part being removed to illustrate a recess in the fixture.
Figure 3:
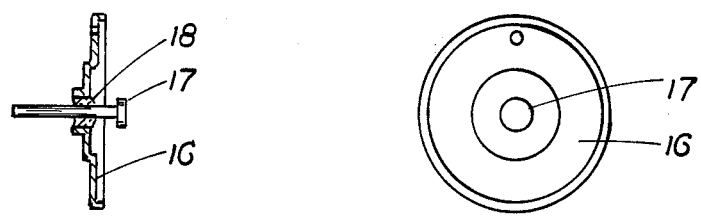
FIG. 3 is an enlarged cross-sectional view of a terminal assembly and housing part in the form of a battery cover such as disclosed in FIGS. 1 and 2.
Figure 4:
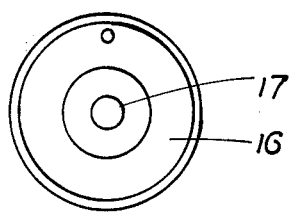
FIG. 4 is a top view of the terminal assembly and housing part of FIG. 3.

Referring to FIGS. 1 and 2 of the drawings, a plurality of heat conductive carbon support fixtures 13 are disclosed as removeably mounted in contiguous relationship to rest on upper flight 7 of endless conveyor 6. Each fixture 13 includes rows of spaced recesses. As can be seen in FIG. 2, each recess 14 in carbon fixtures 13 is contoured to snuggly receive and firmly support a housing part in the form of a metallic, heat conductive battery cover 16 (FIG. 3). Battery cover 16 has a centrally disposed aperture therein to receive terminal pin 17 and surrounding cylindrical glass sleeve 18 assembly therein. In glass sealing operations, the recessed carbon fixtures 13 serve to hold and support the battery covers 16 with the glass sleeves 18 and terminal pins 17 supportedly assembled in the apertures thereof in a vertical, preselected position relative their battery covers.

As can also be seen in FIGS. 1 and 2 of the drawings, each carbon fixture 13 is provided with a set (four) of spaced ceramic vertical columns 19. Columns 19 can be removably or permanently mounted on carbon fixtures 13 and serve to support the heat control plate assemblies 21. Each plate assembly 21 includes an upper ceramic plate 22 having a white metallic powdered heat reflective coating on the upper surface thereof and a lower heat absorptive black, carbon plate 23 facing the lower surface of upper plate 22. Positioned above plate assemblies 21 in spaced relation thereto to extend in a transverse fashion to the direction of flight movement in spaced relation to each other are electrical heating elements 24 which, like heating elements 11, can also be of a suitable nichrome alloy. These elements 24 serve as a second or minor heating means in oven chamber 2 to impart sufficient energy to fixture 13 to insure flow of glass sleeves 18 in battery covers 16 with optimum heat energy usage. In this regard and referring to FIG. 6, it can be seen that a portion of the heat energy from electric heating elements 24 is reflected by the metallic coating on the upper surface of plate 22 and a portion of the heat energy is conducted through the absorptive lower carbon plate 23 to radiate a very minor portion of the heat to fixtures 13 and the housing parts with the terminal assemblies supported thereon.

Figure 5:
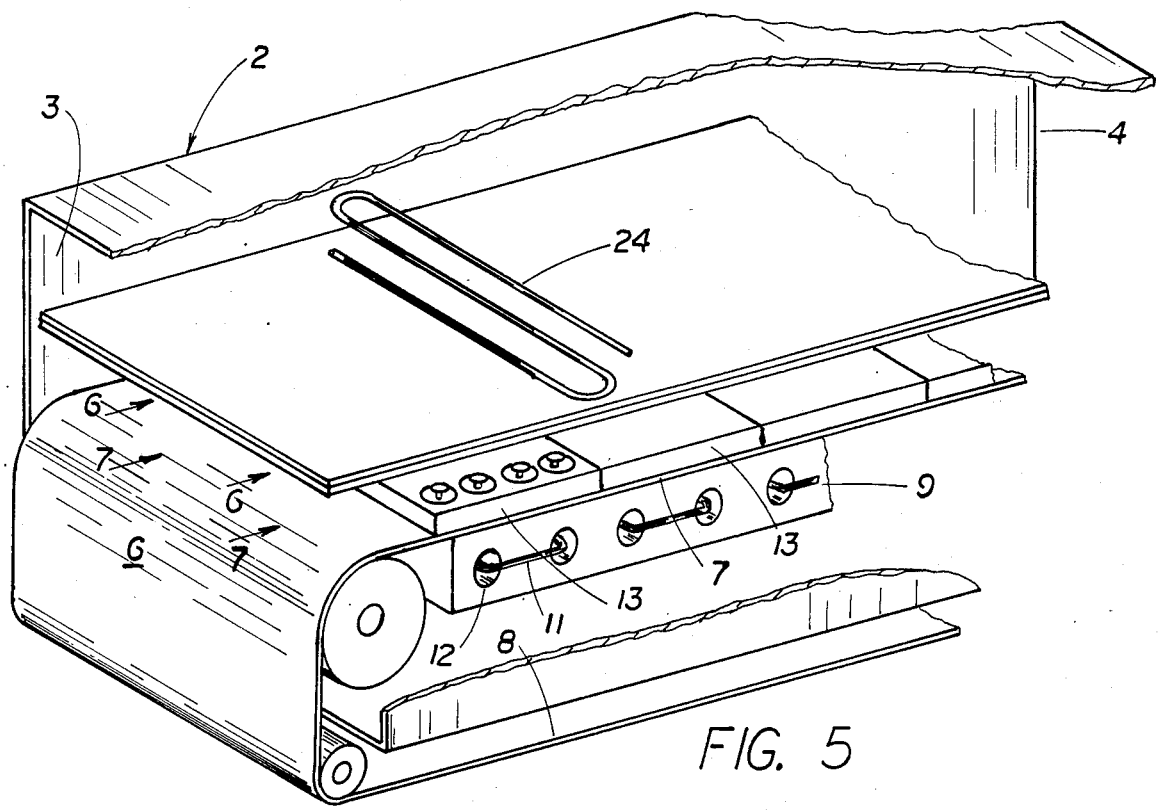
FIG. 5 is a partially broken away isometric view of a portion of a modified embodiment of the novel heating oven arrangement.

Referring to FIG. 5, a modified structure is disclosed with plate assembly 21 including upper reflectively coated ceramic plate 22 and lower absorptive carbon plate 23, each being a continuous longitudinally extending sheet which can be supported from housing oven chamber 2. With such an arrangement the individual sets of vertical columns 19 on fixtures 13 can be eliminated.

Figure 6:
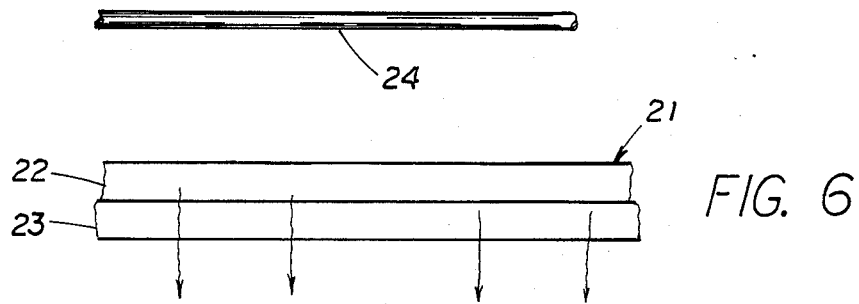
FIG. 6 is an enlarged cross-sectional view of a portion of the heating oven of FIG. 5, taken in a plane passing through line 6—6 of FIG. 5, disclosing details of the inventive plate assembly; and, FIG. 7 is an enlarged cross-sectional view of a portion of the heating oven of FIG. 5 taken in a plane passing through line 7—7 of FIG. 5, disclosing details of the novel application of a heating gradient across the terminal assembly of a battery cover.
Figure 7:
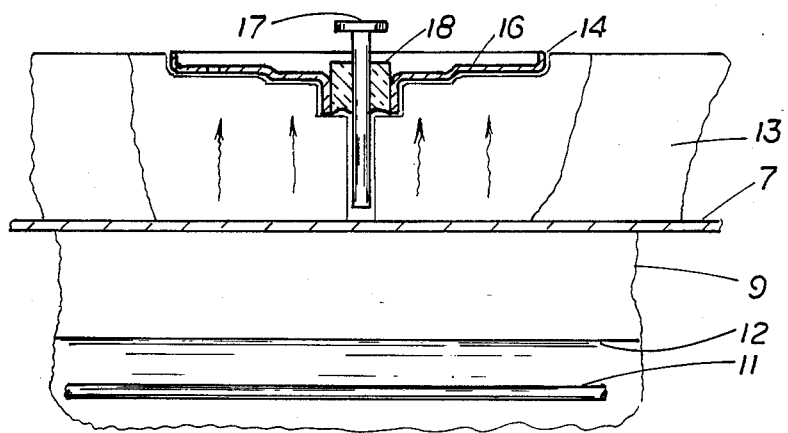

Referring to FIGS. 1, 6 and 7 of the drawings, in a typical operation of forming glass to metal hermetic seals in the terminal assemblies of metallic battery covers 16, each battery cover, as aforenoted, having a centrally disposed terminal pin receiving aperture extending therethrough, a terminal pin 17 surrounded by a glass sleeve 18 is inserted into each of the pin receiving apertures of battery covers 16. The battery covers with the pins and sleeves assembled therein are supportedly mounted in the recesses of heat conductive carbon support fixtures 13 with the longitudinal axes of pins 17 and glass sleeves 18 positioned in substantially vertical position on the fixtures when the fixtures are placed in contiguous relation on the upper flight 7 of heat conductive endless conveyor 6 at inlet end 3 of oven chamber 2. Conveyor 6 is driven at a preselected speed by a suitable motor (not shown) to maintain the glass sleeves in the heating zone for a preselected residence time. Advantageously, the residence time in the oven is selected to be in the range of approximately ten minutes to 40 minutes, the specific temperatures selected depending upon such parameters as the specific heats involved, the heat conductivity properties of the materials involved and the oven temperatures involved. Advantageously, oven temperature ranges from approximately 1500° F. to approximately 1900° F. can be utilized. Such oven temperatures in oven chamber 2 are obtained through electric heating elements 11 and 24.

As can be seen in FIG. 7, a major portion of a glass melting heating gradient is transmitted conductively from heating elements 11 through silicon carbide block up to the lower portion of metallic battery covers 16 through the upper flight 7 of the metallic endless heat conductive belt and the heat conductive contiguous carbon support fixtures 13. As can be seen in FIG. 6, a very minor portion of the heating gradient is transmitted radiantly to the upper portion of metallic covers 6 through the heat reflective surface on the upper ceramic plate 22 and the lower heat absorptive carbon plate 23 of plate assembly 21. Thus, glass sleeves 18 in battery covers 16 are caused to flow in an upwardly direction from bottom to top to firmly fuse terminal pins 17 in battery covers 16 with minimal voids occurring.

As aforenoted, various changes can be made in the structure and method disclosed without departing from the spirit of the present invention. For example, modifications to the heating elements, conveyor belt and to material selections of the several parts can be made by one skilled in the art to accommodate desired glass sealing conditions for specific articles to be fused.

Further, support fixtures can be modified to accommodate other types of terminal assemblies such as those where one or more glass sleeved pins are disposed in an assembly cover in an off-center relationship.

The invention claimed is:

1. A method of forming glass to metal hermetic seals in a terminal assembly of a housing part having a terminal pin receiving aperture extending therein comprising:
inserting a terminal pin surrounded by a glass sleeve into the aperture of said housing part; inserting said housing part with the pin and glass sleeve, supportedly disposed in the aperture thereof into a generally confined heating zone with the longitudinal axes of said pin and glass sleeve supported in the aperture of the housing part in a substantially vertical position; and applying an upwardly directed glass flowing heating gradient to said housing part from a location below said housing part in the aperture of which said pin and glass sleeve are supportedly disposed while said part is disposed in said generally confined heating zone so that a major portion of the heat flows upwardly, the heat being sufficient to melt the glass sleeve in an upwardly direction from bottom to top to firmly fuse the terminal pin in said housing part aperture with minimal voids.

2. The method of claim 1, wherein the upwardly moving glass melting temperature gradient in said heating zone is in the approximate range of 1500° F. to 1900° F.

3. The method of claim 1, wherein at least the major portion of said glass melting heating gradient in said heating zone is transmitted conductively to the lower portion of said housing part and said glass sleeve supported in said housing part.

4. The method of claim 1, wherein at least the major portion of said glass melting heating gradient in said heating zone is transmitted conductively to the lower portion of said housing part and said glass sleeve supported in said housing part and a minor portion of said heating gradient in said heating zone is transmitted radiantly to the upper portion of said housing part.

5. The method of claim 1, wherein at least the major portion of said glass melting heating gradient in said heating zone is transmitted conductively to the lower portion of said housing part and a minor portion of said heating gadient in said heating zone is transmitted radiantly to the upper portion of said housing parts in the aperture of which said pin and glass sleeve are supportedly disposed through a heat reflective and heat absorptive surface.

6. The method of claim 1, wherein said housing part with the assembled pin and glass sleeve is supportively disposed through a supporting medium in said heating zone with heat being transmitted conductively to said housing part and said glass sleeve supported in said housing part upwardly through said supporting medium.

7. The method of claim 1, wherein a plurality of housing parts with respectively assembled pins and glass sleeves are supportively disposed through a supporting medium in said heating zone with contiguous heat conductively being transmitted to said housing part and said glass sleeve supported in said housing part through said supporting medium.

8. The method of claim 1, wherein a plurality of housing parts with respectively assembled pins and glass sleeves are supportively disposed through a supporting medium in said confined heating zone with contiguous heat conductively transmitted to said housing parts and said glass sleeves supported in said housing parts through said supporting medium to move through said confined heating zone endlessly at a preselected speed to maintain said glass sleeves in said heating zone for a sufficient residence time to permit upward glass melt and fusion.

9. A method of forming glass to metal hermetic seals in terminal assemblies of metallic battery housing covers, each having at least one terminal pin receiving aperture extending therethrough comprising: inserting a terminal pin surrounded by a glass sleeve into each of said pin receiving apertures of said battery covers; mounting said battery covers with the pins and sleeves assembled therein unto recessed heat conductive support fixtures with the longitudinal axes of the pins and glass sleeves supportedly positioned in a substantially vertical position on said fixtures; mounting said support fixtures with the assembled battery covers thereon in contiguous relation on the upper flight of a heat conductive metallic endless conveyor controlled to move through a heating zone at a preselected speed to maintain said glass sleeves in said heating zone for a preselected residence time; applying an upwardly directed glass flowing heating gradient to said battery housing covers in the approximate range of 1500° F. to 1900° F., the major portion of said glass melting heating gradient being transmitted conductively to the lower portion of said metallic covers through said upper flight of said metallic endless conveyor and said contiguous support fixtures and the minor portion of said heating gradient being transmitted radiantly to the upper portion of said metallic covers through a heat reflective and heat absorptive surface in said heating zone so as to flow the vertically disposed glass sleeves in said battery covers in an upwardly direction from bottom to top to firmly fuse the terminal pins in said battery covers with minimal voids.

* * * * *